(12) United States Patent
Hill et al.

(10) Patent No.: US 8,136,278 B2
(45) Date of Patent: Mar. 20, 2012

(54) ELECTROLUMINESCENT ONE-WAY VISION PANEL

(75) Inventors: George Roland Hill, Stockport (GB); Christopher David Parry, Farnham Common (GB)

(73) Assignee: Contra Vision Limited, Stockport (GB)

( * ) Notice: Subject to any disclaimer, the term of this patent is extended or adjusted under 35 U.S.C. 154(b) by 526 days.

(21) Appl. No.: 12/065,826

(22) PCT Filed: Jul. 18, 2006

(86) PCT No.: PCT/GB2006/002684
§ 371 (c)(1),
(2), (4) Date: Mar. 5, 2008

(87) PCT Pub. No.: WO2007/010250
PCT Pub. Date: Jan. 25, 2007

(65) Prior Publication Data
US 2009/0077846 A1     Mar. 26, 2009

(30) Foreign Application Priority Data
Jul. 18, 2005   (GB) ................................ 0514642.8

(51) Int. Cl.
*G09F 13/22*   (2006.01)
(52) U.S. Cl. ............. 40/544; 428/690; 445/24; 313/506
(58) Field of Classification Search ............ 40/541–544; 428/690, 688, 691; 313/498–512; 257/40; 345/76
See application file for complete search history.

(56) References Cited

U.S. PATENT DOCUMENTS

| 2,919,366 | A | * | 12/1959 | Mash | 313/509 |
|---|---|---|---|---|---|
| 4,457,089 | A | * | 7/1984 | Phillips, Jr. | 40/544 |
| 4,673,609 | A | * | 6/1987 | Hill | 428/187 |
| 5,856,031 | A | * | 1/1999 | Burrows | 428/690 |
| 6,203,391 | B1 | | 3/2001 | Murasko | |

(Continued)

FOREIGN PATENT DOCUMENTS

DE      296 06 511 U1      7/1996
(Continued)

OTHER PUBLICATIONS

International Search Report issued in PCT/GB2006/002684, dated Nov. 3, 2006, 3 pages.

(Continued)

*Primary Examiner* — Joanne Silbermann
*Assistant Examiner* — Shin Kim
(74) *Attorney, Agent, or Firm* — Pillsbury Winthrop Shaw Pittman LLP

(57) ABSTRACT

An electroluminescent (EL) one-way vision, see-through graphics panel comprises a sheet of light permeable material with a uniform electrically conductive coating. A print pattern comprising an electroluminescent ink system partially covers the sheet of light permeable material forms an 'EL lamp'. A design is superimposed on, or forms part of, the print pattern such that the design is visible from only one side of the panel. The design can be a uniform color, but is typically a multi-color graphic image. The EL lamp illuminates the design when subjected to an electrical current. If the light permeable material is transparent, through vision is possible from the other side of the panel through the unprinted portions of the transparent material. A dark colored opaque mask layer faces in the direction of the other side of the panel to mask the other print pattern layers and enable good through vision.

27 Claims, 16 Drawing Sheets

U.S. PATENT DOCUMENTS

| | | | |
|---|---|---|---|
| 6,242,076 B1 * | 6/2001 | Andriash | 428/138 |
| 6,424,088 B1 | 7/2002 | Murasko | |
| 6,811,895 B2 * | 11/2004 | Murasko et al. | 428/690 |
| 6,965,196 B2 * | 11/2005 | Murasko et al. | 313/506 |
| 7,068,179 B2 * | 6/2006 | Snell et al. | 340/686.6 |
| 7,645,177 B2 * | 1/2010 | Kwasny | 445/24 |
| 7,719,187 B2 * | 5/2010 | Ray et al. | 313/509 |

FOREIGN PATENT DOCUMENTS

| | | |
|---|---|---|
| GB | 2 165 292 A | 4/1986 |
| WO | 99/06157 | 2/1999 |
| WO | 99/65679 | 12/1999 |
| WO | 00/46022 | 8/2000 |

OTHER PUBLICATIONS

Written Opinion of the International Searching Authority issued in PCT/GB2006/002684, dated Nov. 3, 2006, 6 pages.

International Preliminary Report on Patentability issued in PCT/GB2006/002684, dated Nov. 3, 2006, 7 pages.

* cited by examiner

Y-Y

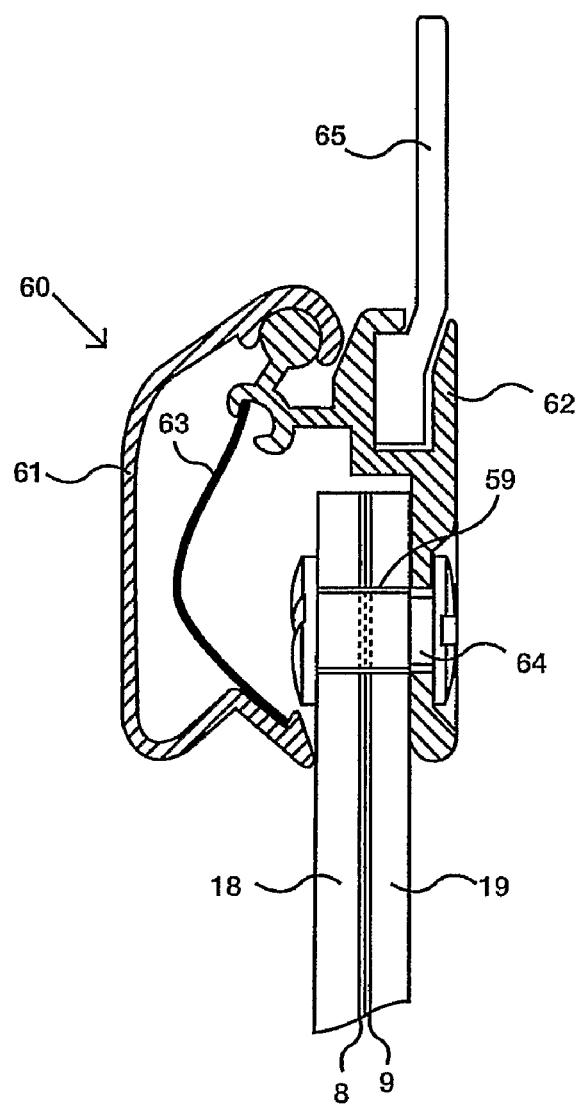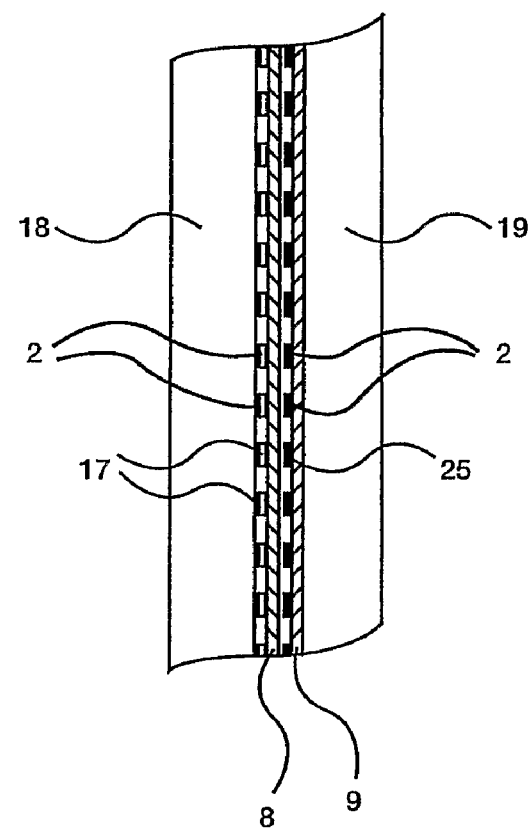
Fig. 10B
Fig. 10C

ELECTROLUMINESCENT ONE-WAY VISION PANEL

CROSS REFERENCE TO RELATED APPLICATIONS

This is the U.S. National Phase of PCT/GB2006/002684, filed Jul. 18, 2006, which in turn claims priority to British application 0514642.8, filed Jul. 18, 2005, both of which are incorporated herein in their entirety by reference.

BACKGROUND TO THE INVENTION

GB 2 165 292 (Hill) discloses one-way vision, see-through graphics panels comprising a light permeable material, an opaque silhouette pattern and a design superimposed on or forming part of the silhouette pattern, such that the design is visible from one side of the panel but is not visible from the other side of the panel. GB 2 165 292 also discloses a number of vision control options or effects enabled by that invention. The most common vision control effect used in practice is a one-way vision panel providing a design visible from one side of the panel and good vision through the panel from the other side, typically having a black layer of the silhouette pattern facing in the direction of the other side.

Electroluminescent panels are known and electroluminescent ink systems are known.

U.S. Pat. No. 6,242,076 (Andriash) describes a perforated electroluminescent panel which provides a one-way vision panel, typically based on a self-adhesive vinyl (polyvinyl chloride) material and continuous, uniform, electroluminescent system layers that are perforated throughout their thicknesses, and the perforated assembly is imaged with a transparent or translucent design.

EP 0 858 399 and WO 02/070269 disclose methods of managing the inevitable lack of registration of superimposed ink layers printed by conventional printing methods, in order to enable the desired design colours to be visible by an observer of a one-way vision panel.

BRIEF DESCRIPTION OF THE INVENTION

According to the present invention, an electroluminescent one-way vision panel comprises a design visible from one side of the panel and not visible from the other side of the panel, a sheet of imperforate light permeable material having two sides, one side facing said one side of said panel and the other side facing said other side of said panel, said sheet comprising a light permeable electrically conductive coating over the whole area of the other side of the sheet, a print pattern applied to the electrically conductive coating which subdivides the panel into printed portions and unprinted portions, the print pattern comprising an electroluminescent ink system comprising a printed electroluminescent ink layer, a printed dielectric ink insulating layer and a print pattern conductive ink layer, wherein the design is superimposed on or forms part of the print pattern, and wherein the design comprises a transparent or translucent design layer, and wherein the conductive coating and the print pattern conductive ink layer are connected to an electrical power supply, and wherein the electroluminescent ink layer is capable of being illuminated by means of electric current through the conductive coating and the print pattern conductive ink layer, and wherein illumination of the electroluminescent layer illuminates the design.

The light permeable material typically comprises a clear, transparent film or semi-rigid sheet material, typically a polyester film which is uncoated on one side and is substantially uniformly sputter-coated with a light permeable electrically conductive coating, typically a clear, transparent, conductive coating of indium tin oxide (ITO), on the other side. A commercially available pre-coated light permeable material is T-Mox®, a registered trade mark of IST/Bekaert. The term "imperforate" does not preclude discrete holes for a pin registration system or fixing system or other purpose.

The dots or lines or other elements of the print pattern are independent of the design. If an observer standing close to either type of panel moves away from the panel, a position is reached at which the observer can see the design but can no longer discern individual dots, lines or other elements of the pattern. Through visibility is provided through the transparent portions between the dots, lines or other elements of the pattern.

The electroluminescent ink system is printed on the conductive-coated side of the light permeable material, in the desired print pattern, typically a pattern of lines, leaving clear, unprinted gaps between the printed lines that allow a substantially clear view through the unprinted portions of the transparent material.

The electroluminescent ink system typically comprises three printed layers which are superimposed within the print pattern:

(i) an electroluminescent ink layer (commonly known as a "phosphor"), which is directly applied to the conductive-coated surface of the light permeable material,
(ii) a dielectric (electrically insulating) ink layer, and
(iii) a print pattern conductive ink layer (commonly known as a "backplate"), typically a conductive silver ink that is printed over the dielectric ink layer.

The dielectric ink layer overlaps the edges of the print pattern conductive ink layer, so as to ensure that the print pattern conductive ink layer is fully insulated from the uniform conductive coating.

In order to mask the electroluminescent ink system layers from being viewed from the rear of the panel and to enable the system to work most effectively as a see-through graphics panel, there is typically provided a dark opaque mask layer, typically of black ink, applied to overlap the other print pattern layers, such that when viewed from the other side, only the opaque dark mask layer and the transparent portions of the light permeable material are visible. The dark opaque mask layer obscures the electroluminescent ink system and the subsequently applied design layer. The design layer is typically applied to or placed in front of the side of the light permeable material remote from the electroluminescent ink system. The portions of unprinted light permeable material, if transparent, are typically of sufficient area and sufficiently closely spaced to allow good vision through the panel from the other side.

A first conductive busbar is printed or otherwise applied to connect up the elements of the print pattern conductive ink layer, typically a print pattern of lines. The elements of the print pattern conductive ink layer may be referred to as "silver backplates". These are connected to a single, first connector and thereby to the power supply. A second conductive busbar is printed or otherwise applied in a way that electrically insulates it from the first busbar and the print pattern conductive ink layer and connects the uniform conductive ink layer to a second connector and thereby to the power supply. This is typically done by a printed second conductive busbar which surrounds and is spaced from the print pattern. The busbars and electrical connectors typically comprise silver inks.

Optionally, the first and/or the second conductive busbars are overprinted with the dark opaque mask layer, typically black, to provide a consistent visible impression from the other side of the panel.

When electric currents of appropriate voltage and frequency are applied to the print pattern conductive ink layer and the uniform conductive coating, the intermediate layer of electroluminescent ink (or phosphor) emits light. The light is transmitted through the uniform conductive coating and its transparent carrier film or sheet material.

This whole assembly is known as an "EL lamp".

The electroluminescent ink system, for example of phosphors, dielectric and conductive silver inks, may be solvent based (for example Luxprint® inks from DuPont) or UV curing (for example ELG™ series inks from Nor-Cote).

In order to both protect the printed EL ink system and electrically insulate all the conductive surfaces, the printed side of the EL lamp may be over-laminated with a transparent, electrically insulating film incorporating a clear adhesive (for example overlaminating film 01-070 from Madico). This protective overlaminate is sufficiently clear and is applied in such a way as to allow a viewer from the other side to be able to view through the clear transparent portions between the printed portions. Alternatively or additionally, the unlaminated or the overlaminated, electrically conductive side of the EL lamp may be affixed to a backing sheet, typically a transparent semi-rigid plastic sheet material, for example cast acrylic (PMMA), that provides both electrical insulation and a transparent semi-rigid support for the whole construction.

Typical electroluminescent inks (the "phosphor" inks) are non-white in colour when not illuminated, for example of a pink hue. In order to reduce the visual effect of the non-white colour on the perceived colours of the design layer applied directly onto or placed in front of the EL lamp, a transitional ink layer, typically a translucent white ink layer, is optionally printed onto the surface of the light permeable material remote from the uniform conductive coating, within print pattern, and typically in substantial register with the print pattern. Optionally, such a transitional ink layer is printed on another sheet of light permeable material, typically a separate transparent film layers to which the design layer is applied, which is referred to as a design panel. This design panel is adhered to or otherwise located on the one side of the EL lamp. In either case, the translucent white layer is preferably printed or positioned in such a way as to ensure that it does not overlap beyond the edge of the dark opaque mask layer and as such remains unseen when the EL panel is viewed from the other side.

The design image is optionally printed in register with the print pattern of the EL lamp using suitable solvent-based or UV-curing translucent graphic inks, onto the one, uncoated side of the light permeable material. Alternatively, the design image is printed, using suitable aqueous, solvent-based or UV-curing translucent graphic inks, onto a suitable another sheet of light permeable material, for example a transparent self-adhesive film, for example self-adhesive polyester film, which is applied to the one, uncoated side of the light permeable material. Alternatively, the design is in the form of a self-adhesive film, for example self-adhesive vinyl film, cut in the form of the print pattern and applied to the one, uncoated side of the light permeable material, in registration with the print pattern of the EL lamp. Alternatively, any of the above methods are used to apply the design image to another sheet of light permeable material, typically transparent, that is subsequently placed adjacent to and preferably in contact with the EL lamp, in such a way as to place the design image in register with the print pattern of the EL lamp. The use of a separate design panel with a design layer, that is placed in front of and preferably in direct contact with the one side of the EL lamp but which is not an integral part of the lamp itself, facilitates the changing of the design image while leaving the EL lamp itself unaffected. Such an arrangement is particularly beneficial if the design is to be regularly changed, for example to advertise different products or services in a shop window. In any case, the design should be printed or positioned in such a way as to ensure that the design does not overlap beyond the edges of the dark opaque mask layer and thereby remains unseen when the panel is viewed from other side.

A cross-section can be taken through the electroluminescent one-way vision panel comprising the sheet of light permeable material coated with a uniform electrically conductive coating on said other side of said sheet and having two outer edges and said print pattern being disposed on only part of said sheet and applied directly to said electrically conductive coating, said print pattern comprising at least three layers including an electroluminescent ink layer, a dielectric ink insulating layer, and a conductive ink layer, said cross-section comprising alternate printed portions of said sheet and unprinted portions of said sheet, each said printed portions having two outer edges, a plurality of said printed portions being constructed and arranged such that they each include a part of said electroluminescent ink layer and a part of said dielectric ink insulating layer and a part of said conductive ink layer, said plurality of said printed portions each including two outer edges of said part of said electroluminescent ink layer and two outer edges of said part of said dielectric ink insulating layer and two outer edges of said part of said conductive ink layer, and wherein within each of said plurality of said printed portions said part of said dielectric ink insulating layer is located between said part of said electroluminescent ink layer and said part of said conductive ink layer, and wherein each of said two outer edges of said part of said electroluminescent ink layer and each of said two outer edges of said part of said conductive ink layer is located within said two outer edges of said part of said dielectric ink insulating layer, and wherein the average width between said two outer edges of said plurality of printed portions is less than one centimeter.

An essential component of the electrical system used to power the EL lamp is an "inverter". The inverter takes a DC input voltage of designated size and converts it into the designated AC voltage and frequency that has been determined to give the appropriate light output and life for the EL lamp. The inverter input voltage can typically vary from 5 v to 24 v DC (either direct from a battery or from a mains supply via a transformer). The inverter output voltage can vary from 40 v to 220 v AC, but would typically be in the 60 v to 120 v AC range. The inverter output frequency can vary from 50-3000 Hz, but would typically be in the 400-850 Hz range.

The following rules apply, in general, to the performance of EL lamps:
(i) the higher the inverter output voltage, the greater the light output,
(ii) the higher the inverter output frequency, the greater the light output,
(iii) the higher the inverter output frequency, the "bluer" the light output,
(iv) the lower the inverter output frequency, the "greener" the light output, and
(v) the greater the initial light output, the shorter the life of the lamp ("life" being typically measured as the life in hours to a level of illumination that is half that of the initial level, commonly called the "half-life").

In order to ensure that the EL lamp works as efficiently as possible and that it emits the minimum amount of audible noise, the inverter size is determined by the printed area of the EL lamp, the larger the area of the panel the greater the power output required from the inverter.

Because a see-through graphic panel requires the viewer to be able to see through the transparent portions of the panel from the other, non-design side and because this is most visually effective when the printed area is seen from that side as a dark opaque pattern, it is not possible to illuminate the design from the other side of the panel by using conventional "backlighting" techniques, for example using a conventional "light box". This invention enables a light source to be integral with the panel and encapsulated between the dark opaque mask layer and the design image, thus illuminating the design from behind the design from within the print pattern layers, while still enabling a viewer from the other side of the EL panel to see through the transparent unprinted portions.

Optionally, the EL lamp is constructed as a number of discrete, electrically independent areas, "tiles" or sections. Each section is electrically insulated from other sections and is connected to a control system to enable the illumination of the whole lamp (all the individual sections of the lamp simultaneously), each section separately or in any combination of sections. Optionally, the sections are illuminated in a pre-determined sequence. The arrangement of the individual sections of the EL lamp and the illumination sequence is optionally used to illuminate parts of the design in a pre-determined sequence or pattern, thus enhancing the visual impact and/or the effective communication of the illuminated display.

Power to the EL panel is controlled manually or by means of a control system. A control system is preferably automatically activated by any one of several means, for example a timing device to illuminate the panel at pre-determined intervals, or a light-sensing device to illuminate the panel during times of low ambient lighting (for example after dark), or a movement-sensing device to illuminate the panel when someone walks past or up to the panel, or any combination of these devices. For example, a panel of the invention affixed to an automatic opening glass door or an adjacent window is advantageously activated by the same proximity sensor that activates the automatic opening of the door. The attention of a person entering through the door is thus automatically attracted to the electroluminescent sign.

In order that the present invention may be more readily understood specific embodiments thereof will now be described with reference to the accompanying drawings in which.

Figure 3A:
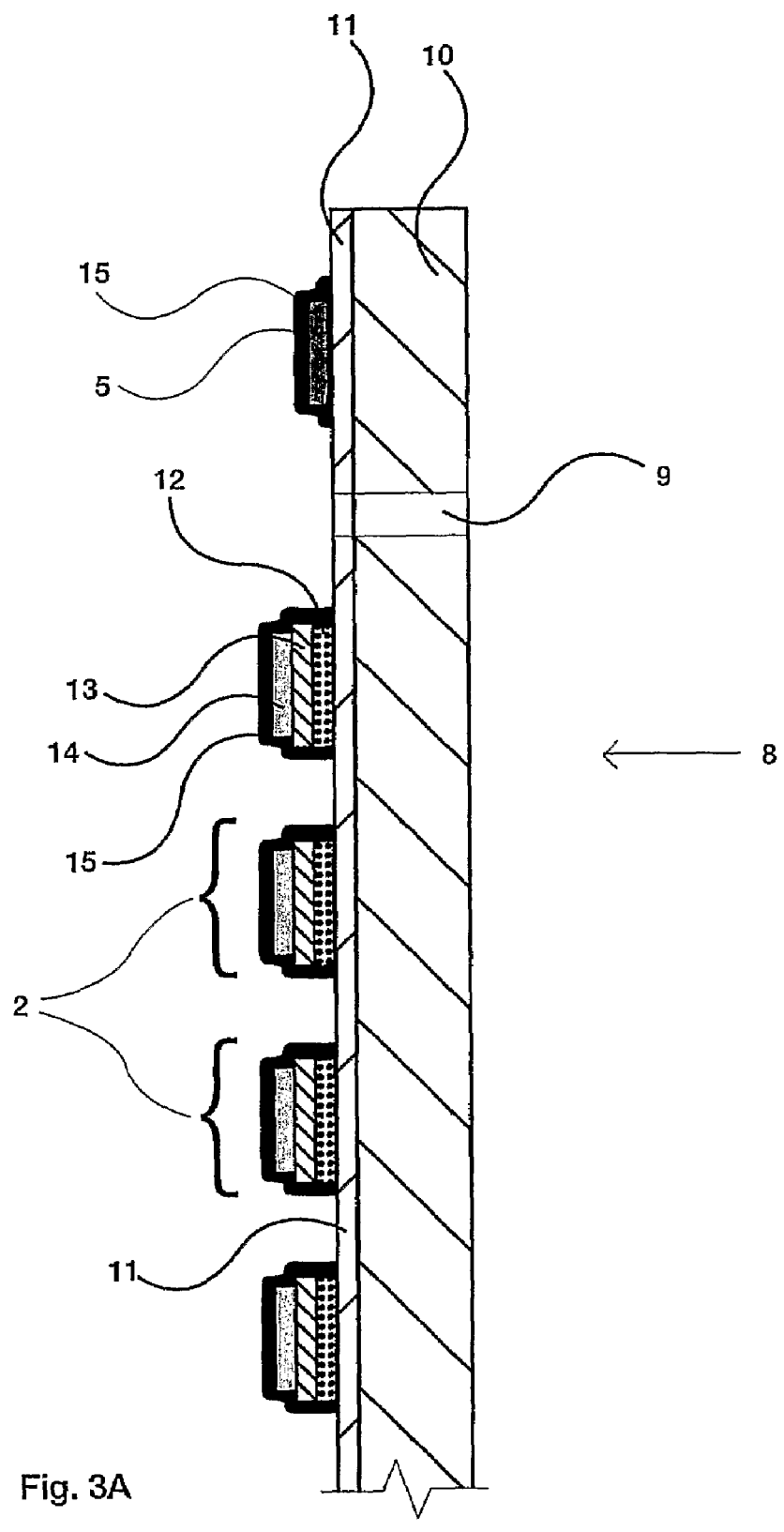

FIGS. 3A and B are cross-sections through an EL lamp.

Figure 4:
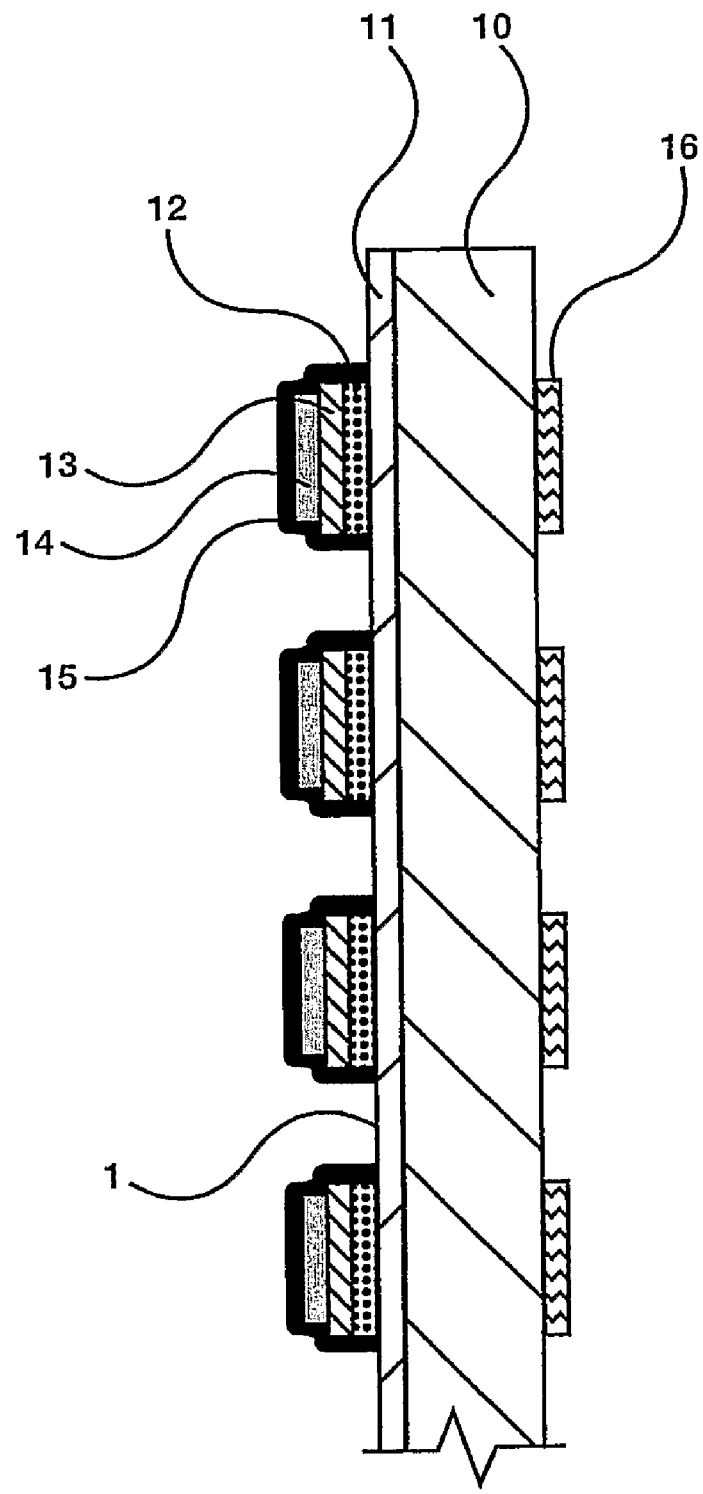

FIG. 4 is a cross-section through an EL lamp with translucent white ink printed onto the one, front side, in registration with the print pattern.

Figure 5:
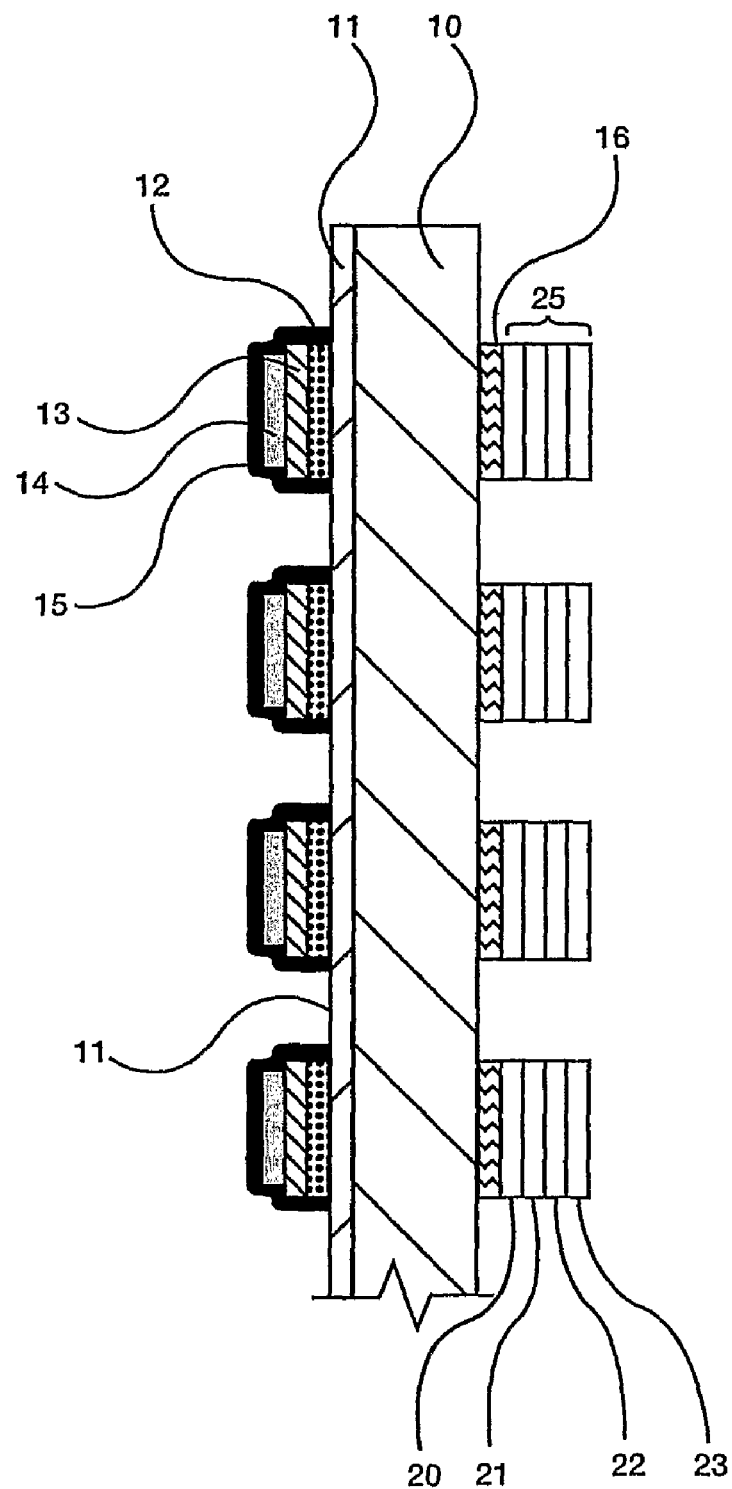

FIG. 5 is a cross-section through a panel with translucent white ink and a translucent design printed onto the one, front side, in registration with the print pattern.

Figure 6A:
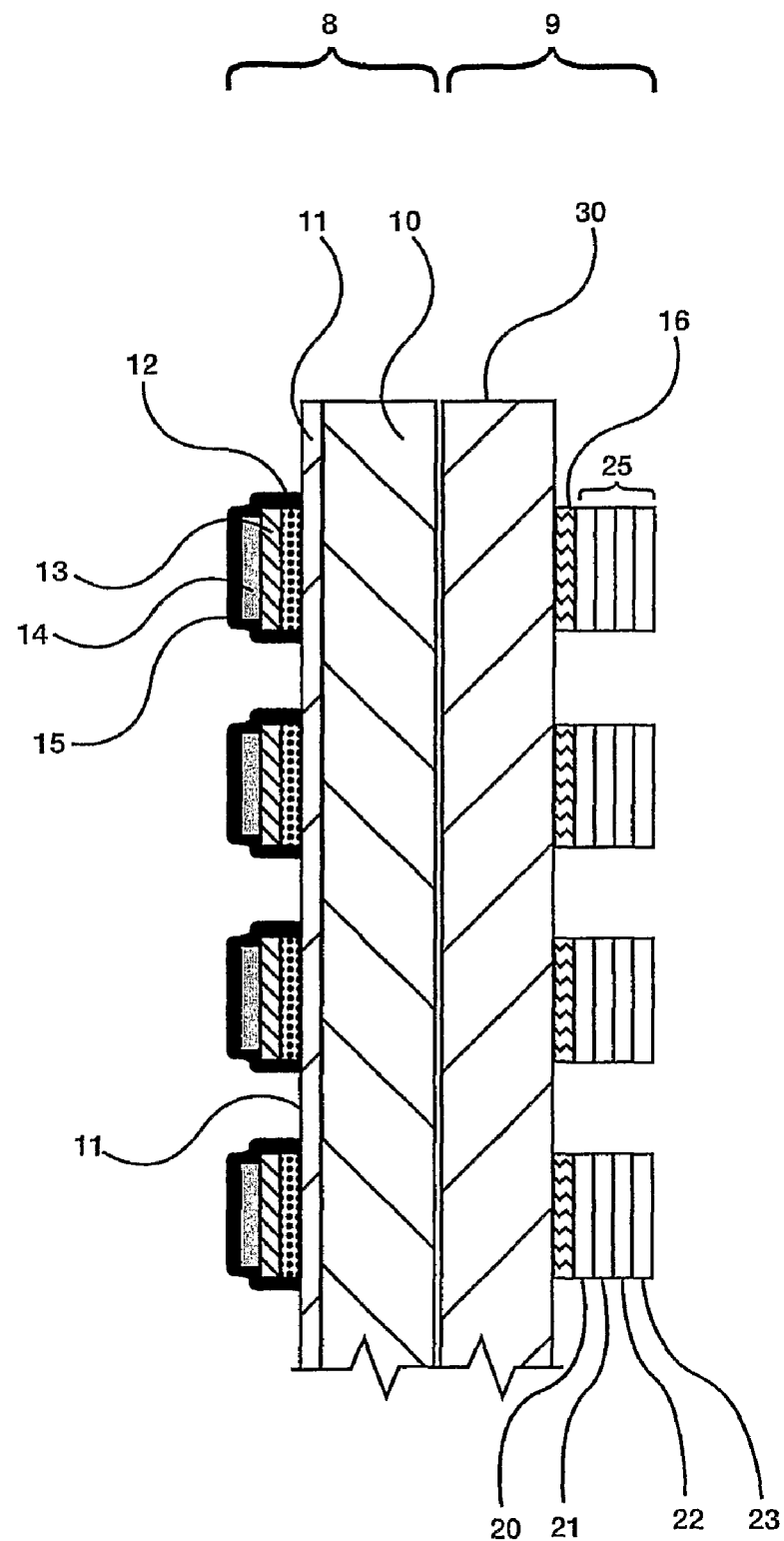

FIGS. 6A and B are cross-sections through a panel of the invention with a design panel comprising another, separate transparent material and placed in contact with the one, front side of the EL lamp.

Figure 6B:
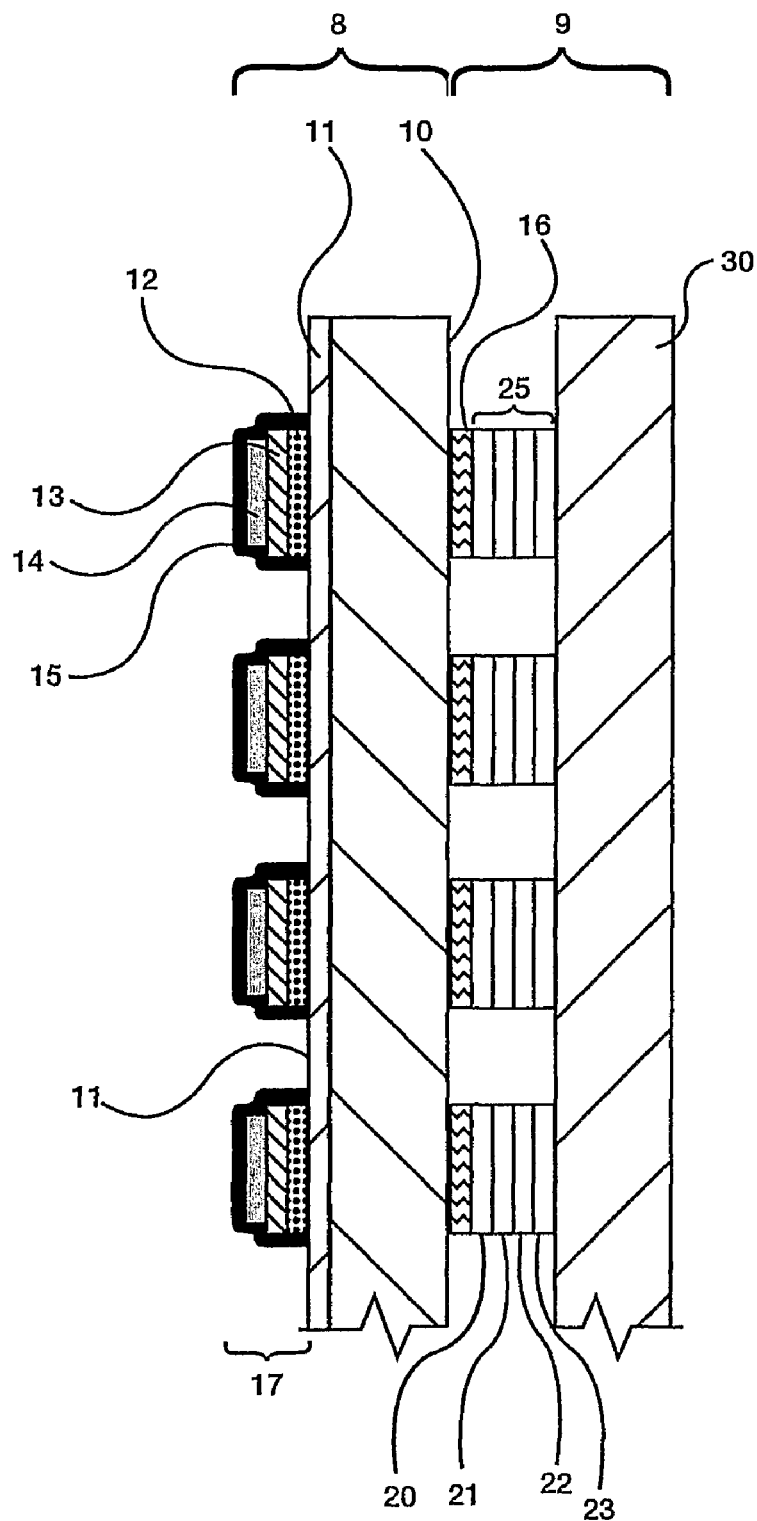
Figure 7:
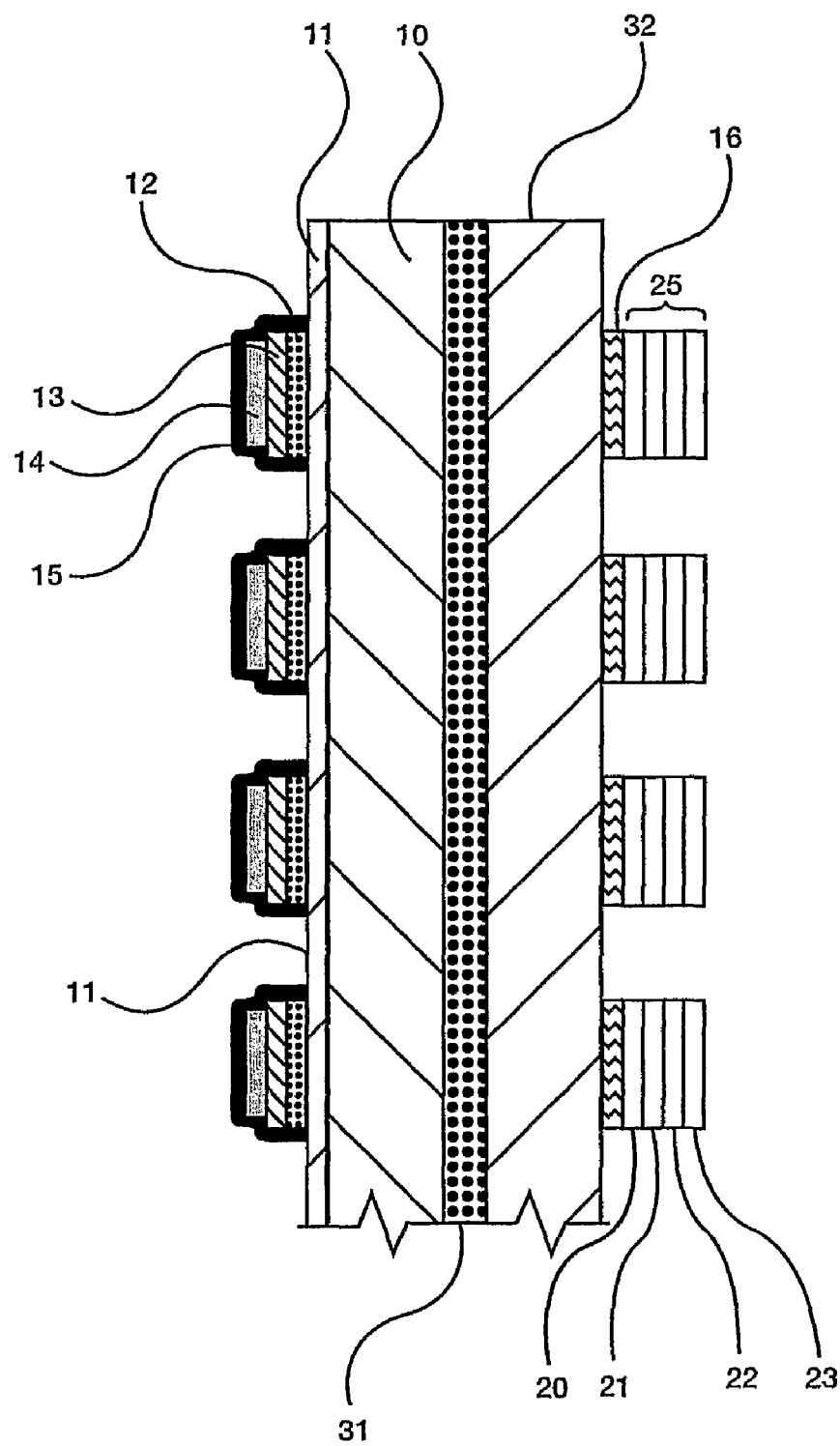

FIG. 7 is a cross-section similar to FIG. 6, but with the separate transparent material having a pressure-sensitive adhesive layer that enables it to be bonded to the one, front side of the EL lamp.

Figure 8:
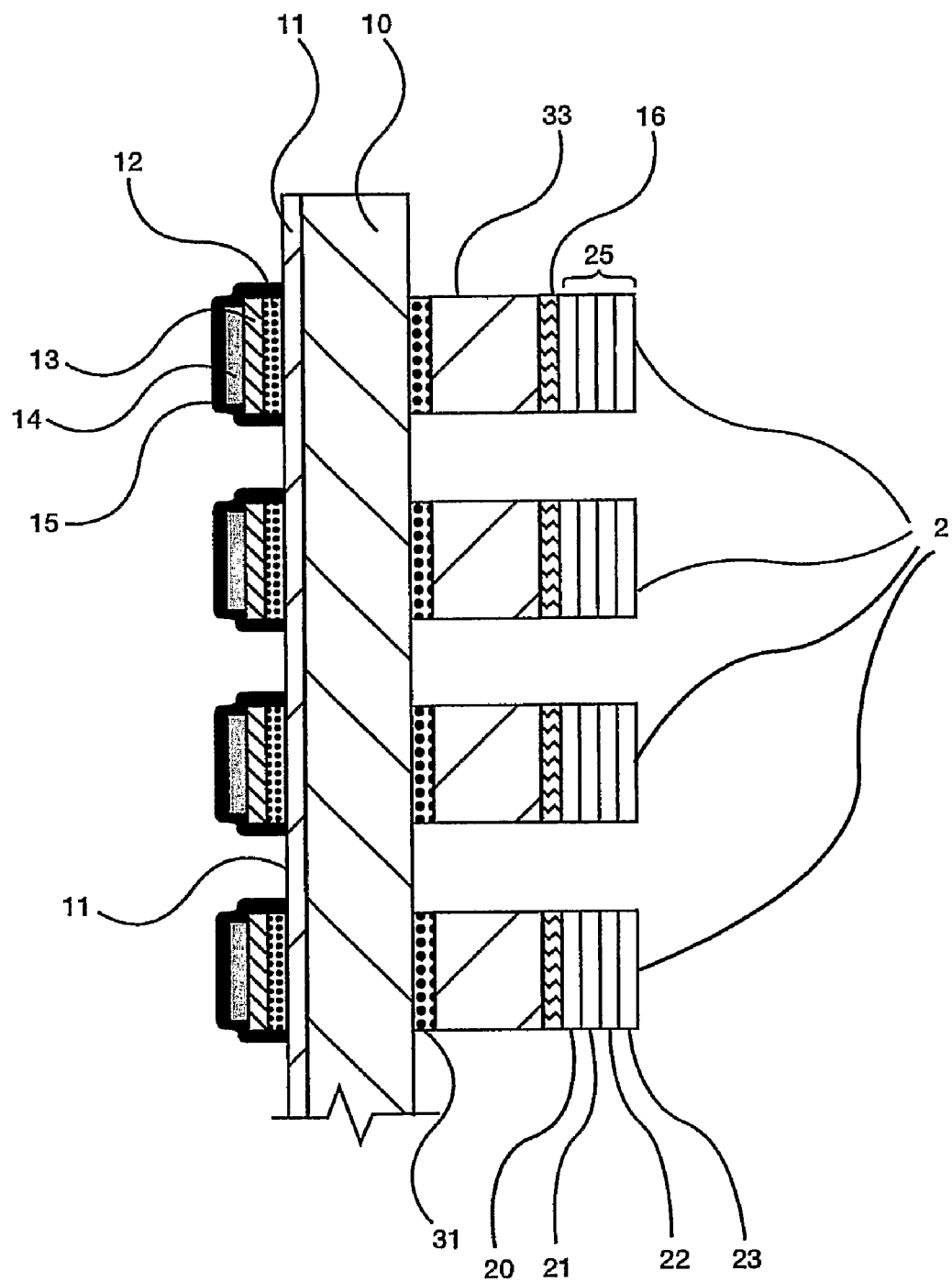

FIG. 8 is a cross-section similar to FIG. 7, but with cut self-adhesive film with the translucent design applied to the one, front side of the EL lamp.

Figure 1:
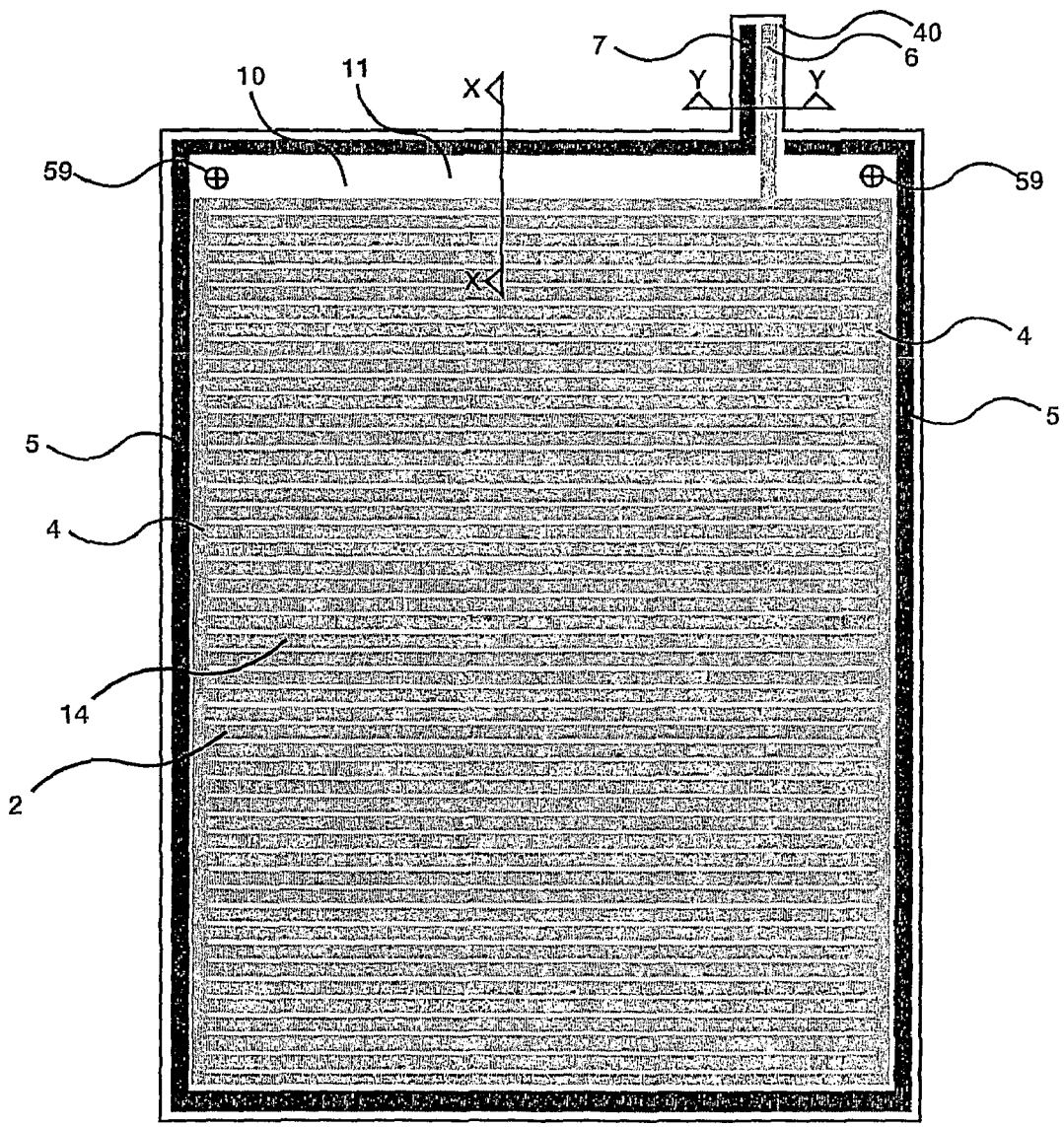
FIG. 1 is a schematic view of the rear (other) side of the light permeable material, printed with an electroluminescent ink system in accordance with the invention, with the conductive ink layer, the first and second busbars and their connections.
Figure 2:
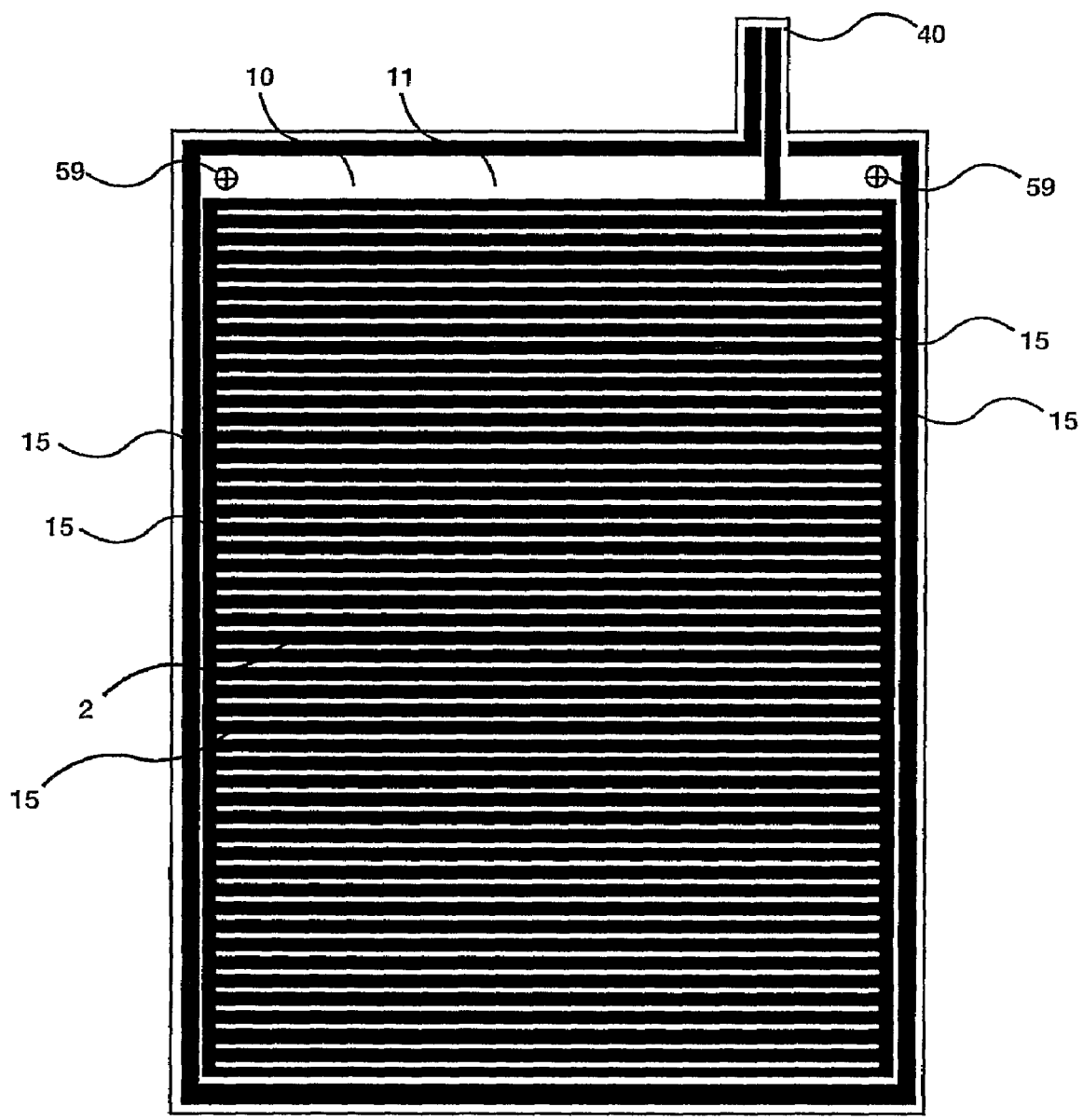
FIG. 2 is a view from the rear (other) side of a panel of the invention showing a dark layer masking the electroluminescent ink system.
Figure 9:
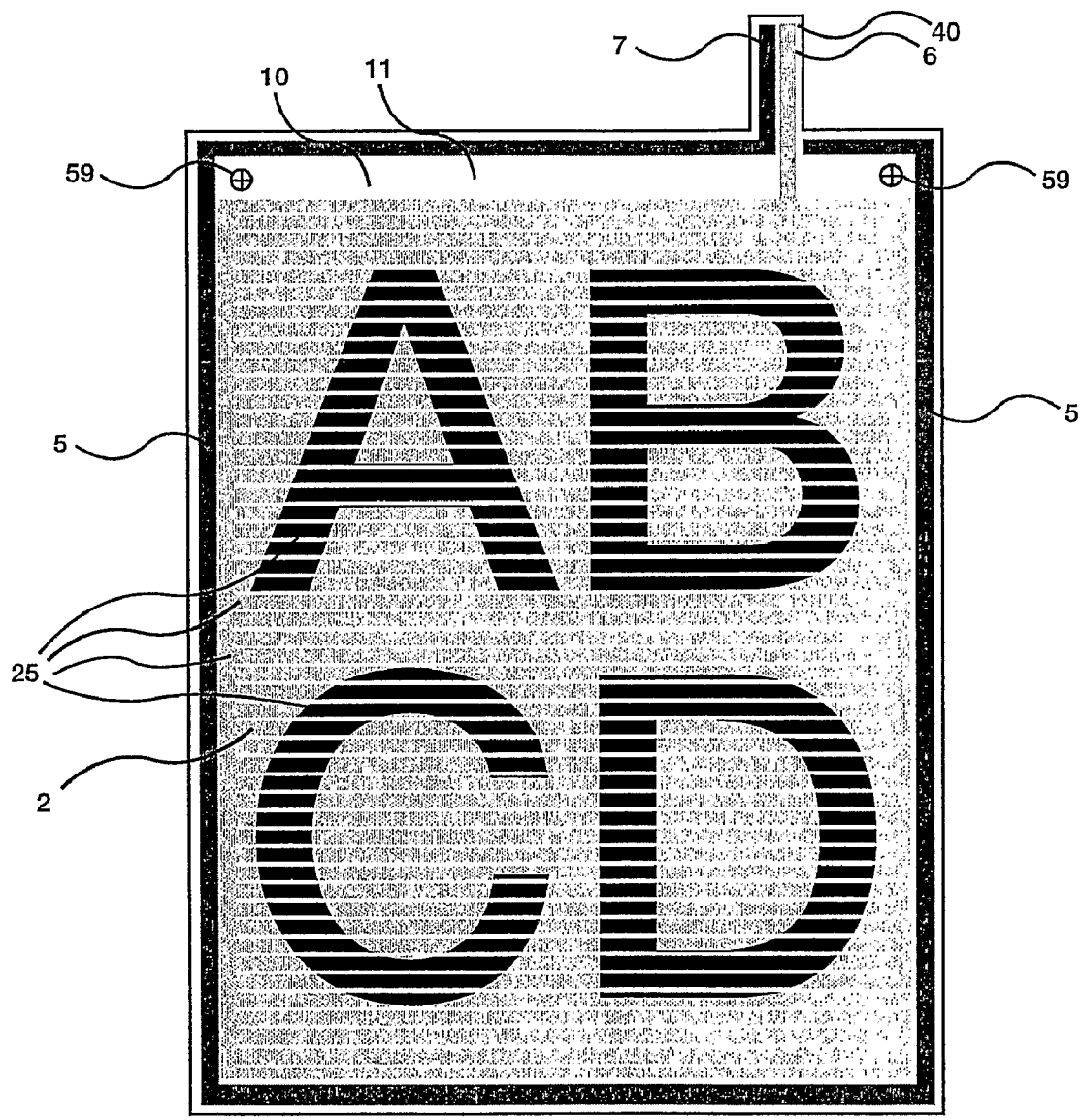

FIG. 9 is a front view of a panel of any combination of FIGS. 1 and 2 and one of FIGS. 3-8, illustrating the inclusion of a design layer.

FIG. 10A-F illustrate a sign system according to the invention in which elements of the panel are registered by a pin registration system and clipped together.

Figure 11:
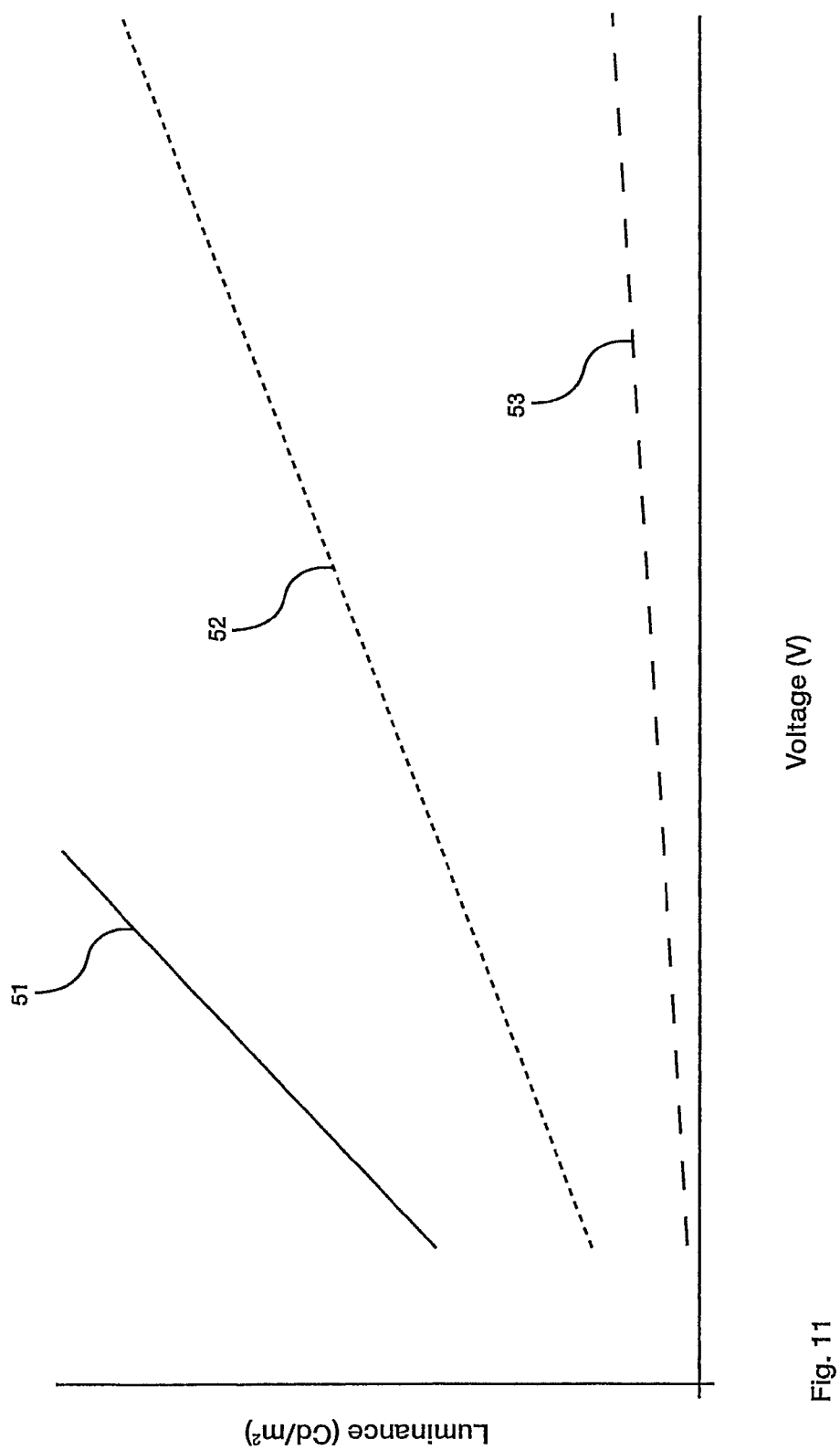

FIG. 11 is a graph illustrating the relationship between Voltage, Frequency and Illuminance of a sign of the invention.

In these figures, a print pattern of straight lines is used for example purposes only. The print pattern can be of any pattern that sub-divides the light permeable material into a plurality of otherwise discrete printed areas that are connected by busbars, for example straight, angled (for example chevron, or zigzag) lines in any orientation or curved lines, for example a series of semi-circular or sinusoidal curves, each line having an unbroken and electrically insulated connection to a busbar, and/or a plurality of unprinted areas, for example a net or filigree pattern.

The figures are not to scale, for example print pattern lines are shown of greater proportional width than would typically be the case, for the sake of clarity. Actual line or other print pattern element widths typically are less than 1 cm, and preferably less than 5 mm, and more preferably less than 3 mm. The print pattern typically covers between 50% of the area of the panel (for example a pattern of 2.0 mm lines at 4.0 mm centres, up to 80% of the area of the panel (for example 3.2 mm lines at 4.0 mm centres).

FIGS. 1-9 illustrate typical elements of one-way vision, electroluminescent panels having a design visible from one (front) side, the panel being capable of good through vision from the other (rear) side.

FIG. 1 illustrates a sheet of light permeable material 10, typically transparent, for example a polyester film, coated with a uniform electrically conductive coating 11, the coating is typically a clear, transparent, conductive coating of indium tin oxide (ITO), on the other side. A commercially available pre-coated light permeable material is T-Mox®, a registered trade mark of IST/Bekaert. It is printed in the form of a print pattern 2 with an electroluminescent ink layer (not visible), on which is superimposed a dielectric ink insulating layer (not visible), on which is superimposed print pattern conductive ink layer 14. The electroluminescent ink system, for example of phosphors, dielectric and conductive silver inks, may be solvent based, (for example Luxprint® inks from DuPont) or UV curing (for example ELG™ series inks from Nor-Cote). The print pattern 2 of lines has first conductive busbars 4 connecting each end of the print pattern lines. First connector 6 on an EL lamp "tail" 40 connects the print pattern conductive ink layer 14 to the electrical power supply. The second conductive busbar 5 surrounds and is spaced from the print pattern of lines and connects the conductive coating to the power supply by means of second connector 7. Optional holes 59 through the light permeable material 10 are one of several alternative means of optionally registering a design panel, a second sheet of transparent material carrying the design, to the EL lamp.

FIG. 2 is a view of electroluminescent lamp 8 from the same rear, (other) side of the panel as FIG. 1, showing optional dark opaque mask layer 15, typically black, superimposed over the electroluminescent ink system within print pattern 2 (not visible), first conductive busbars 4 and second conductive busbar 5 (not visible), enabling good visibility through the remaining transparent portions of the light permeable material 10. The dark opaque mask layer 15 is a solvent ink if the electroluminescent ink system is solvent-based or UV-curing if the electroluminescent ink system is UV-cured.

FIG. 3A is a diagrammatic cross-section X-X in FIG. 1 through electroluminescent lamp 8. The EL lamp 8 comprises light permeable material 10, typically transparent, a uniform electrically conductive coating 11, typically transparent, and the individual portions of print pattern 2, typically an array of lines as illustrated in FIGS. 1 and 2. The electroluminescent ink system comprises electroluminescent ink layer 12 applied directly to the conductive coating 11 and superimposed by dielectric ink insulating layer 13, which overlaps the electroluminescent ink layer 12. The print pattern conductive ink layer 14 is superimposed onto and spaced within the edges of dielectric ink insulating layer 13, thus ensuring insulation of print pattern conductive ink layer 14 from the conductive coating 11. Optional opaque mask layer 15, typically black, typically overlaps all the layers 12, 13 and 14 of the electroluminescent ink system. Optionally fixing hole 9 is used to register the EL lamp with a second transparent material carrying the design. Second conductive busbar 5 connects the conductive coating 11 to the electrical power by means of second connector 7, as illustrated in FIG. 1, and is also typically overlain by dark opaque mask layer 15.

Figure 3B:
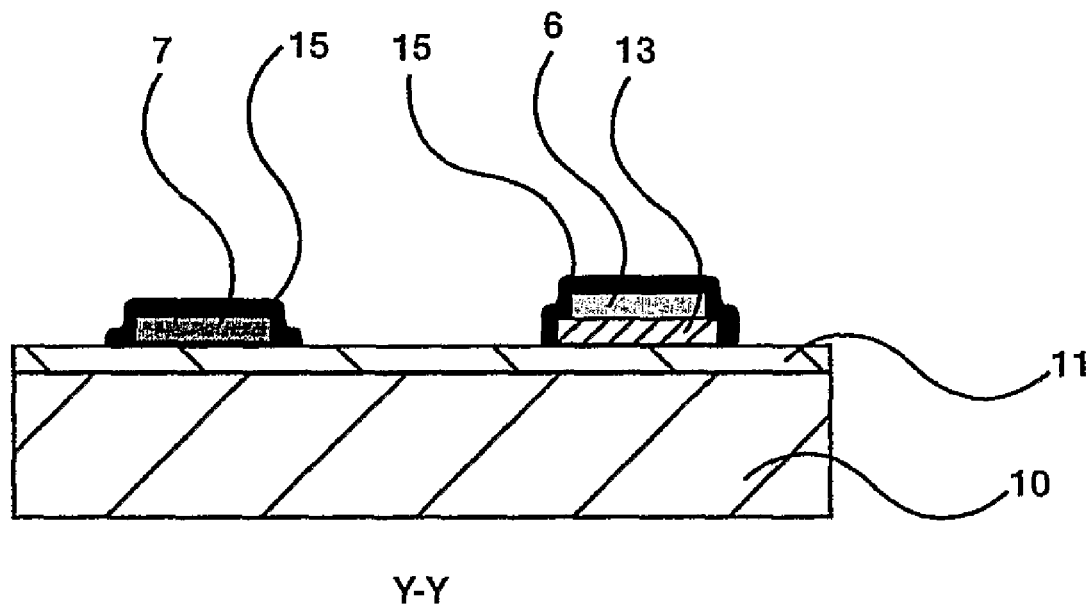

FIG. 3B is a diagrammatic cross-section Y-Y in FIG. 1, through the EL lamp "tail" 40. This shows the small width of light permeable material 10 with its conductive coating 11 and the means of connecting the two electrical circuits to the electrical power supply, being first connector 6 superimposed on an extension of the dielectric ink insulating layer 13 and second connector 7 applied directly to the conductive coating 11, both connectors being superimposed by dark opaque mask layer 15, in order to produce a consistent impression from the other side of the panel, for aesthetic reasons and to enable the best through vision through all parts of the one-way vision panel. The busbars and electrical connectors typically comprise silver inks.

FIG. 4 is a cross-section through the EL lamp with optional translucent white ink layer 16, to provide a white background to a design, located on the one, front side of light permeable material 10. The reason for this optional layer 16 is that a typical electroluminescent ink layer 12 appears a distinctive colour, for example pink, when it is not illuminated. When seen during the hours of daylight, the panel thus provides the desired colour rendering of the design, which otherwise would be tinted by the non-illuminated colour of the electroluminescent ink layer 12.

FIG. 5 Illustrates a cross-section through the panel of FIG. 4 with the addition of design layer 25, for example comprising a multi-colour process design, applied to the front side of light permeable material 10, superimposed on optional translucent white ink layer 16. A typical multi-colour process design layer 25 would comprise separate applications of cyan 20, magenta 21, yellow 22 and process black 23, sometimes referred to as a CMYK process. The CMYK colours are typically translucent inks and are printed in register with the translucent white ink layer 16, and within the dark opaque mask layer 15, in order that all other layers of the assembly are masked by this dark opaque mask layer 15 to provide the best possible quality of through vision. Layers 20, 21, 22 and 23 represent one possible example of a design layer 25 which may optionally comprise a single "spot" colour or plurality of spot colours, a six colour process or any other combination of colours required by a particular design.

The EL panel in FIG. 6A has a design panel 9 located in front of electroluminescent lamp 8, comprising another sheet of light permeable material, typically a second transparent material 30 that is typically placed in contact with the uncoated front face of the light permeable material 10, and onto the front side of which is printed a design, typically in lines that correspond to the print pattern of lines on the EL lamp of FIGS. 1, 2, 3A and 3B. Optional translucent white ink layer 16 is applied to second transparent panel 30 within the print pattern before printing the design layer 25. Design layer 25 optionally comprises the four colour translucent inks 20, 21, 22, 23 (CMYK) in registration with the print pattern lines of the EL lamp but not overlapping outside the edges of the dark opaque mask layer 15. The inks used in design layer 25 and optional white ink layer 16 are typically solvent-based or UV-curing translucent graphic inks.

Optionally, the design layer 25 and optional translucent white ink layer 16 are located on the other, rear side of second transparent panel 30 adjacent to the front side of light permeable material 10, as illustrated in FIG. 6B.

FIG. 7 is similar to FIG. 6A, except that self-adhesive film 32 with optional translucent white ink layer 16 and design layer 25 are applied to the front side of light permeable 10, by means of water clear pressure-sensitive adhesive 31, so that the design layer 25 is in register with the lines of the EL lamp, but not overlapping outside the edges of the opaque mask layer 15.

The EL panel in FIG. 8 has a self-adhesive material 33 cut in the form of the print pattern 2, typically a clear vinyl (PVC) film with optional translucent white ink layer 16 and superimposed design layer 25 applied to the front side of light permeable material 10. Alternatively, a self-adhesive translucent white vinyl (PVC) is printed directly with the design layer 25, and cut with pressure-sensitive adhesive layer 31 to form the print pattern 2, typically a pattern of lines that corresponds to the print pattern of lines on the EL lamp. The lines of these self-adhesive films do not overlap outside the edges of the dark opaque mask layer 15.

The printed portions of the electroluminescent ink system are typically protected and insulated by a transparent plastic film and/or sheet material, for example a self-adhesive polyester overlaminate film (not shown).

FIG. 9 illustrates a panel according to FIGS. 1 and 2 and any one of FIGS. 3-8, in which design layer 25 illustrated by indicia "ABCD" is visible from the front side of the panel, located within print pattern 2 so that good through visibility is provided from the other side of the panel.

FIGS. 10A-F illustrate an example of a suitable sign system of the invention comprising registration pins and spring clips to locate and hold elements together in good registration of the print pattern 2.

Figure 10A:
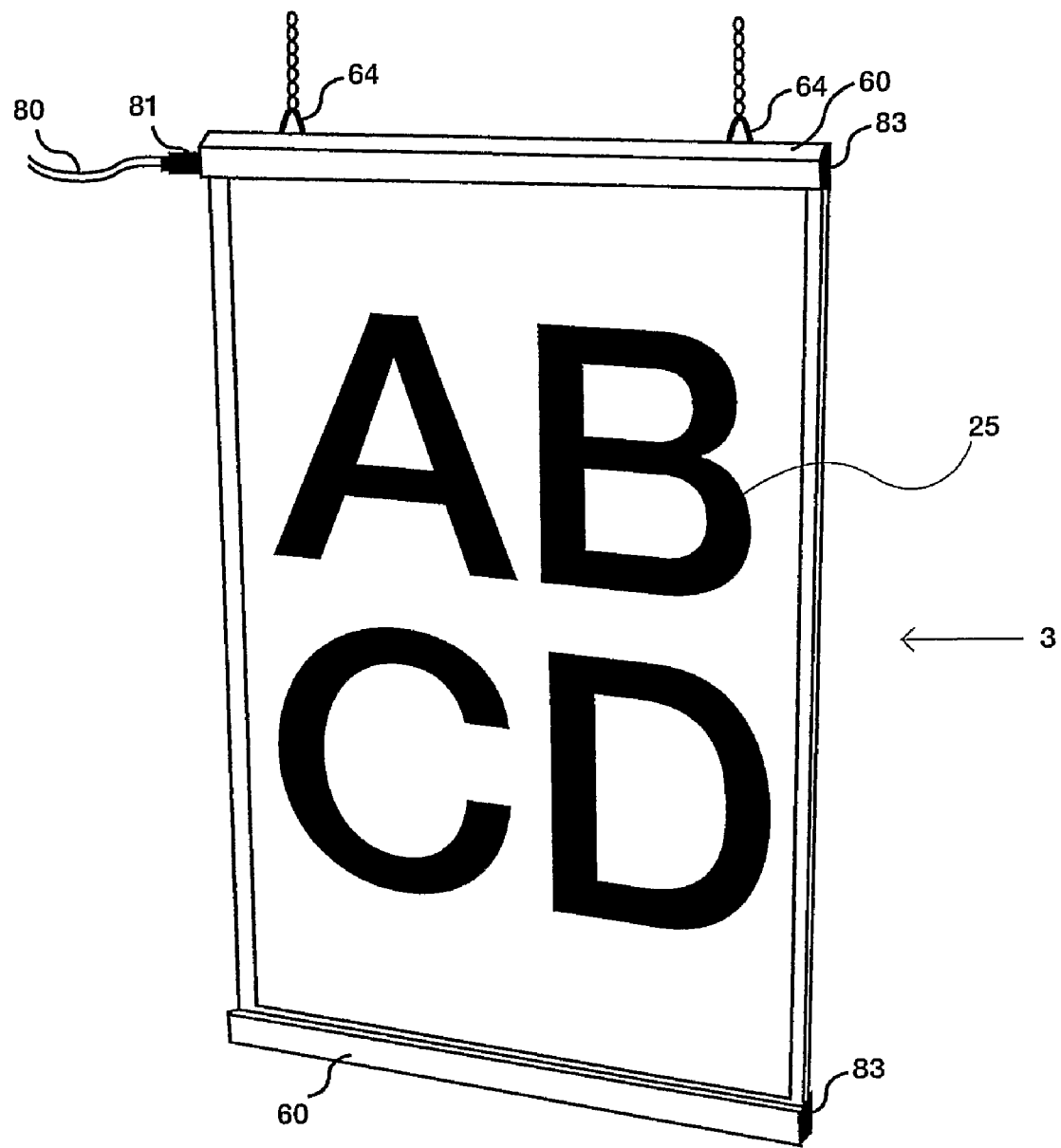

FIG. 10A is a perspective view of the electroluminescent sign system panel 3 hanging by means of hooks 64 which are adjustable in position along the upper spring clip 60 with end caps 83, which enclose the registration pins 64 as shown in FIG. 10B. Electrical current of the selected voltage and frequency is supplied from an inverter to the electroluminescent lamp by means of a connector system comprising "female" connector 81 at the end of electrical cable 80. The design layer 25 is visible from the front of the panel 3 in ambient light conditions, the luminance of the design being increased upon the switching on of the electrical current via electrical cable 80.

FIG. 10B illustrates a cross-section through the upper spring clip 60 comprising continuous, rotatable clip element 61, spring 63 which is typically non-continuous, in discrete locations along spring clip 60, continuous clip element 62 into which are recessed registration pins 64, for example comprising one screw bolt inside an opposing internally threaded sleeve bolt (of annular cross-section) passing through holes 59 in all sheets of the assembly and holding together all sheets of the assembly. Hanging hooks 65 are adjustable horizontally along element 62. Continuous sections 61 and 62 are typically of extruded aluminium alloy sections and spring 63 is typically of spring steel. This pin-registered, spring clip system locates and contains the electroluminescent lamp 8 and design panel 9 within [transparent] optional backing sheet[s] 18 and optional cover sheet 19. The transparent sheets 18 and 19 are, for example, of acrylic or pvc or polycarbonate plastic sheet material and are sufficiently rigid to hold the electroluminescent lamp 8 and design layer 9, both typically comprising plastic film material, for example polyester film, in close contact, and the print patterns of electroluminescent lamp 8 and design panel 9 being in good register, as illustrated in FIG. 10C, such that the printed lamp elements 17 can efficiently illuminate design layer 25. Optionally or in addition, backing sheet 18 comprises a transparent protective film, typically a self-adhesive overlaminating film, typically of polyester.

Figure 10D:
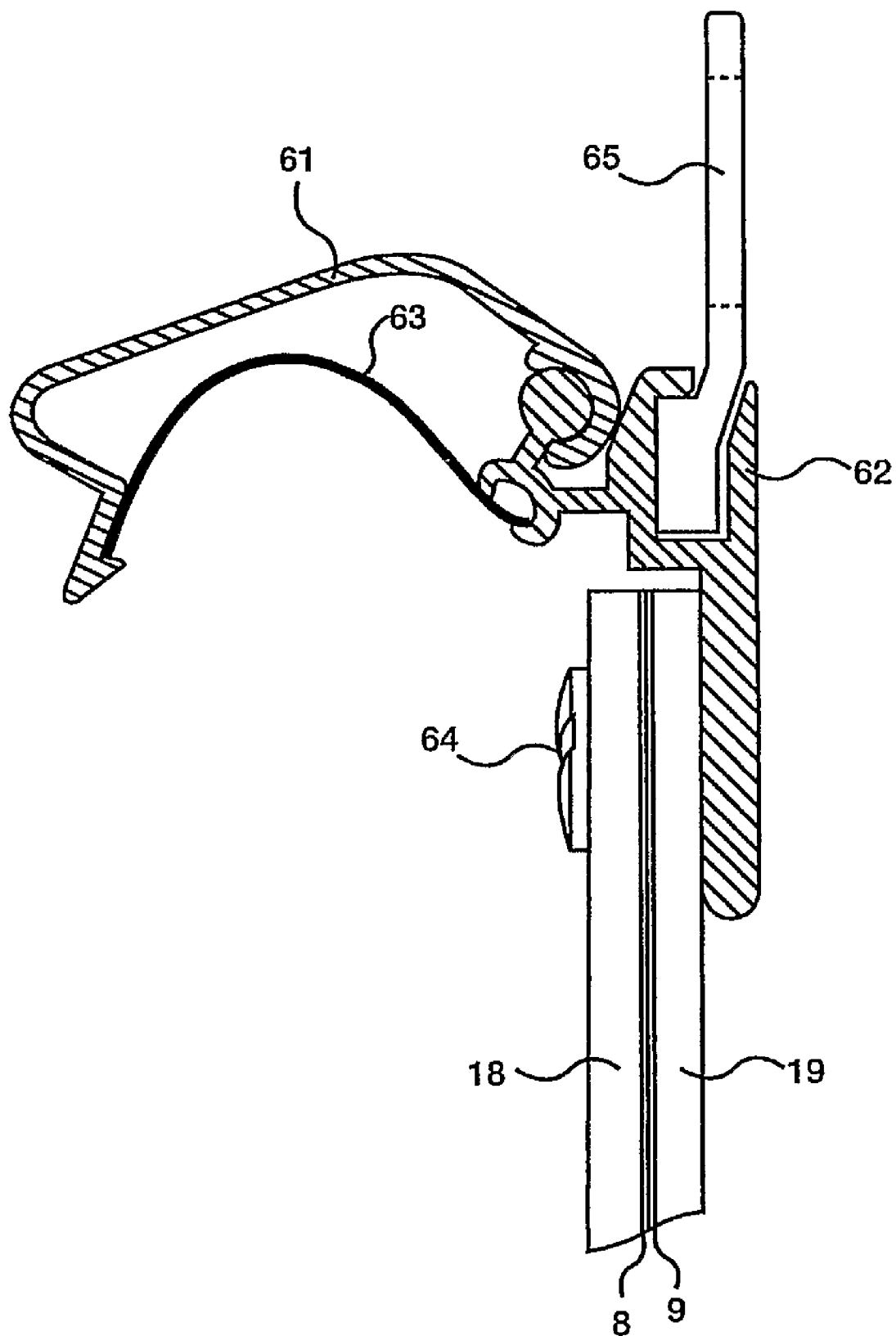

FIG. 10D illustrates the rotatable clip element 61 in position to allow the removal of the panel assembly, for example to change design panel 9 within the assembly.

Figure 10E:
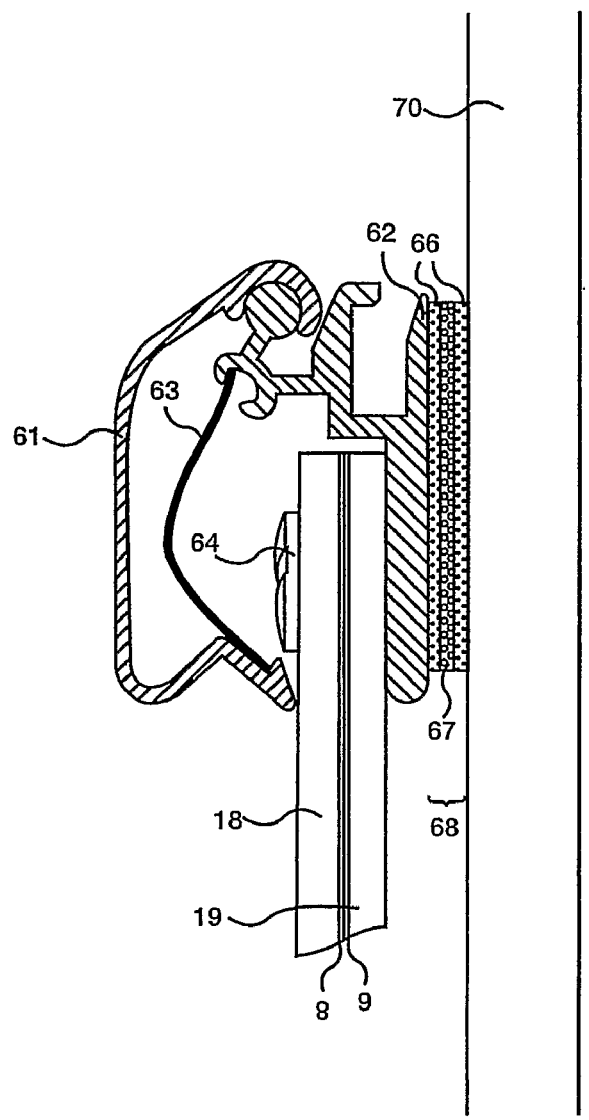

FIG. 10E illustrates an alternative means of using the sign system, by adhering the continuous clip element 62 to a window 70 by means of an adhesive system 68, for example comprising foamed plastic layer 67 and pressure-sensitive adhesive layers 66. The lower clip assembly 60 illustrated in FIG. 10A is optionally similarly adhered to the window 70.

Figure 10F:
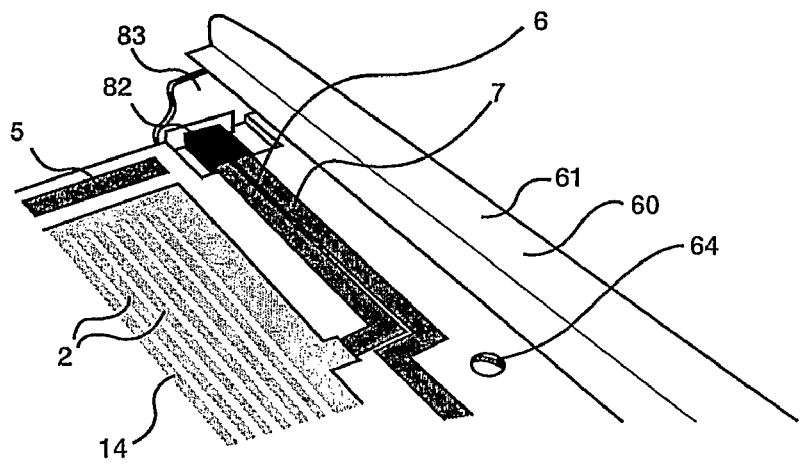

FIG. 10F illustrates a "male" connector 82 that is crimped to the conductive tracks 6 and 7 making an electrically conductive connection to the lamp. The "female" connector 81 of FIG. 10A is inserted into the recessed male connector 82 through end cap 83. By clipping together the "male" and "female" connectors, a safe electrical connection may be made from the inverter to the lamp. Unclipping the connector and thus isolating the lamp from the power supply renders the electroluminescent sign system safe for disassembly for the installation of or changing of design panel 9.

FIG. 11 is a graph illustrating the relationship between Luminance (cd/m$^2$) of the electroluminescent lamps, the Voltage (V) and the Frequency (Hz) of the electrical current. For example line 51 represents the increase in luminance with increase in voltage at 1600 Hz, line 52 represents the increase in luminance with increase in voltage at 400 Hz and line 53 represents the increase in luminance with increase in voltage at 50 Hz. It has been found for a panel size of approximately 410 mm×600 mm, comprising a 125 micron polyester film pre-coated with an electrically conductive coating supplied by FST/Bekaert, with a print pattern of nominally 2.3 mm lines at 3.0 mm centres, comprising electroluminescent ink system layers (1) electroluminescent ink layer of 1.9 mm width at 3.0 mm centres, (2) dielectric ink insulating layer of 1.9 mm width at 3.0 mm centres, (3) silver conductive ink layer of 1.5 mm width at 3.0 mm centres, followed by (4) dark coloured layer of black ink of 2.3 mm at 3.0 mm centres, and a voltage of 120 V, that a frequency ranging from 400 Hz to 700 Hz provides an acceptable range of illuminance for practical embodiments in a retail environment. Tests showed that:
(i) at 120 V, 400 Hz, illuminance is 65 cd/m$^2$, with a "half-life" estimate of approximately 3,000 hours
(ii) at 120 V, 500 Hz, illuminance is 80 cd/m$^2$, with a "half-life" estimate of approximately 2,500 hours
(iii) at 120 V, 700 Hz, illuminance is 100 cd/m$^2$, with a "half-life" estimate of approximately 1,500 hours It is known that electroluminescent inks of higher brightness output have been and are expected to be further developed, enabling increasing visual impact with such improvements in the electroluminescent ink technology.

In any of the above embodiments, the electroluminescent lamp illuminates the design and thereby increases the visibility of the design from one side of the panel, while neither the design nor the means of its illumination are visible from the other side of the panel.

In the panels of U.S. Pat. No. 6,242,076 (Andriash), "opaque coatings are applied to the inside margins of the perforations to prevent light from leaking EL." An advantage of the present invention is that no perforation is required, nor is any such opaque coating to prevent light "leakage", which would otherwise detract from vision through the panel, as the described printed overlap registration system overcomes these two requirements of the prior art.

The method of the present invention, of printing the EL lamp, is more cost-effective than assembling and perforating the many components of an assembly according to Andriash.

It is to be understood that the above described embodiments are by way of illustration only. Many modifications and variations are possible.

The invention claimed is:
1. An electroluminescent one-way vision panel comprises a design visible from one side of the panel and not visible from the other side of the panel, a sheet of imperforate light permeable material having two sides, one side facing said one side of said panel and the other side facing said other side of said panel, said sheet comprising a light permeable electrically conductive coating over the whole area of the other side of the sheet, a print pattern applied to the electrically conductive coating which subdivides the panel into printed portions and unprinted portions, the print pattern comprising an electroluminescent ink system comprising a printed electroluminescent ink layer, a printed dielectric ink insulating layer and a print pattern conductive ink layer, wherein the design is superimposed on or forms part of the print pattern, and wherein the design comprises a transparent or translucent design layer, and wherein the conductive coating and the print pattern conductive ink layer are connected to an electrical power supply, and wherein the electroluminescent ink layer is capable of being illuminated by means of electric current through the conductive coating and the print pattern conductive ink layer, and wherein illumination of the electroluminescent layer illuminates the design,
wherein a cross-section section taken through said panel comprises the sheet of light permeable material coated with a uniform electrically conductive coating on said other side of said sheet, said sheet having two outer edges, said print pattern being applied directly to said electrically conductive coating, said print pattern comprising at least three layers including an electroluminescent ink layer, a dielectric ink insulating layer and a conductive ink layer, said cross-section comprising alternate printed portions of said sheet and unprinted portions of said sheet, each of said printed portions having two outer edges, a plurality of said printed portions being constructed and arranged such that they each include a part of said electroluminescent ink layer and a part of said dielectric ink insulating layer and a part of said conductive ink layer, said plurality of said printed portions each including two outer edges of said part of said electroluminescent ink layer and two outer edges of said part of said dielectric ink insulating layer and two outer edges of said part of said conductive ink layer, and wherein within each of said plurality of said printed portions said part of said dielectric ink insulating layer is located between said part of said electroluminescent ink layer and said part of said conductive ink layer, and wherein each of said two outer edges of said part of said electroluminescent ink layer and each of said two outer edges of said part of said conductive ink layer is located within said two outer edges of said part of said dielectric ink insulating layer, and wherein the average width between said two outer edges of said plurality of printed portions is less than one centimeter.

2. A panel as claimed in claim 1, wherein said light permeable material is transparent.

3. A panel as claimed in claim 1, wherein a dark coloured layer is applied to the surface of said print pattern remote from said light permeable material.

4. A panel as claimed in claim 3, wherein said dark coloured layer is black.

5. A panel as claimed in claim 3, wherein said dark coloured layer overlaps said printed electroluminescent ink layer such that it masks visibility of said printed electroluminescent ink layer from said other side of said panel.

6. A panel as claimed in claim 1, wherein said design layer is applied to said one side of said light permeable material remote from said electroluminescent ink system.

7. A panel as claimed in claim 1, wherein said panel comprises another sheet of light permeable material which is located adjacent to said one side of said sheet of light permeable material, and wherein said design layer is applied to said another sheet of light permeable material.

8. A panel as claimed in claim 7, wherein said another sheet of light permeable material is transparent.

9. A panel as claimed in claim 7, wherein said design layer is applied to the side of said another sheet of light permeable material remote from said sheet of light permeable material.

10. A panel as claimed in claim 7, wherein said design layer is applied to the side of said another sheet of light permeable material adjacent to said sheet of light permeable material.

11. A panel as claimed in claim 1, wherein said design layer is in register with said print pattern.

12. A panel as claimed in claim 7, wherein said design layer is registered to said print pattern by means of a pin register system.

13. A panel as claimed in claim 12, wherein said pin registration system holds together said sheet of light permeable material and said another sheet of light permeable material together.

14. A panel as claimed in claim 1, wherein a protective overlaminate is applied over the printed layers on said other side of said light permeable material.

15. A panel as claimed in claim 1, wherein a front cover sheet of transparent material is located on said one side of said panel.

16. A panel as claimed in claim 1, wherein a backing sheet of transparent material is located on said other side of said panel.

17. A panel as claimed in claim 7, wherein a protective overlaminate is applied over the printed layers on said other side of said light permeable material, wherein a front cover sheet of transparent material is located on said one side of said panel, and wherein all said sheets are held together by a pin registration system.

18. A panel as claimed in claim 7, wherein said panel is supported by means of a clip system.

19. A panel as claimed in claim 1, wherein said electrical power supply is provided through an inverter.

20. A panel as claimed in claim 1, wherein a translucent white ink layer is applied intermediate said light permeable material and said design layer.

21. A panel as claimed in claim 1, wherein said electric current is activated by a proximity sensor.

22. A panel as claimed in claim 21, wherein said proximity sensor also activates the opening of a door.

23. A panel as claimed in claim 1, wherein said electric current is automatically activated by a light-sensing device to illuminate the panel during times of low ambient lighting.

24. A panel as claimed in claim 2, wherein through vision is possible from the other side of the panel through the unprinted portions of the light permeable material.

25. A panel as claimed in claim 1, wherein the design layer comprises a multi-color transparent or translucent design layer.

26. A panel as claimed in claim 1, wherein the design layer comprises translucent, non-light-emitting ink, wherein said translucent, non-light-emitting ink forms the design.

27. A panel as claimed in claim 1, wherein:
the design layer is disposed on said one side of said light permeable material; and
the light permeable electrically conductive coating, the printed electroluminescent ink layer, the printed dielectric ink insulating layer, and the print pattern conductive ink layer are disposed on said other side of said light permeable material.

* * * * *